（12) United States Patent
Ishikawa et al.

(10) Patent No.: US 11,427,259 B2
(45) Date of Patent: Aug. 30, 2022

(54) VEHICLE PILLAR STRUCTURE AND MANUFACTURING METHOD FOR VEHICLE PILLAR

(71) Applicant: TOYOTA JIDOSHA KABUSHIKI KAISHA, Aichi-ken (JP)

(72) Inventors: Sayaka Ishikawa, Toyota (JP); Kazuki Furukawa, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/120,262

(22) Filed: Dec. 14, 2020

(65) Prior Publication Data

US 2021/0188361 A1 Jun. 24, 2021

(30) Foreign Application Priority Data

Dec. 20, 2019 (JP) .............................. JP2019-230954

(51) Int. Cl.
*B62D 25/04* (2006.01)
*B62D 65/02* (2006.01)

(52) U.S. Cl.
CPC .............. *B62D 25/04* (2013.01); *B62D 65/02* (2013.01)

(58) Field of Classification Search
CPC ................................ B62D 25/04; B23K 11/11

USPC ........................................... 296/193.06, 96.18
See application file for complete search history.

(56) References Cited

U.S. PATENT DOCUMENTS

2019/0039553 A1* 2/2019 Komura .................... E04B 2/24
2019/0100248 A1* 4/2019 Yamagishi ............. B62D 25/02

FOREIGN PATENT DOCUMENTS

JP          201964493 A    4/2019
WO   WO-2016139866 A1 *  9/2016   ............. B62D 25/04

* cited by examiner

*Primary Examiner* — Dennis H Pedder
(74) *Attorney, Agent, or Firm* — Hauptman Ham, LLP

(57) ABSTRACT

A vehicle pillar structure is provided including a pillar outer, a pillar inner, a front join section, and a rear join section. The pillar outer and pillar inner includes a first open cross-section and a second open cross-section having an open cross-section profile opening toward a vehicle width direction inner side in cross-section sectioned perpendicular to an extension direction of the pillar outer and the pillar inner. The pillar inner is second open cross-section disposed inside the first open cross-section so as to form a closed cross-section together with the first open cross-section. At the front join section, front walls configuring vehicle front side walls of the first open cross-section of the pillar outer and the second open cross-section of the pillar inner are joined together. At the rear join section, vehicle rear side end portions of the pillar outer and the pillar inner are joined together.

16 Claims, 5 Drawing Sheets

VEHICLE PILLAR STRUCTURE AND MANUFACTURING METHOD FOR VEHICLE PILLAR

CROSS-REFERENCE TO RELATED APPLICATION

This application is based on and claims priority under 35 USC 119 from Japanese Patent Application No. 2019-230954 filed on Dec. 20, 2019, the disclosure of which is incorporated by reference herein.

BACKGROUND

Technical Field

The present disclosure relates to a vehicle pillar structure and a manufacturing method for a vehicle pillar.

Japanese Patent Application Laid-Open (JP-A) No. 2019-064493 discloses a vehicle pillar structure in which a framework with a closed cross-section is formed from a pillar outer (outer member) disposed on a vehicle width direction outer side and a pillar inner (inner member) disposed on a vehicle width direction inner side. The pillar outer disclosed in JP-A No. 2019-064493 is provided with an open cross-section portion that has an open cross-section profile toward the vehicle width direction inner side in a cross-section perpendicular to an extension direction thereof. The pillar inner is provided with an open cross-section portion that has an open cross-section profile toward the vehicle width direction outer side in a cross-section perpendicular to an extension direction thereof. The pillar outer and the pillar inner are superimposed and joined to each other at flanges extending from vehicle front side end portions and vehicle rear side end portions of both the open cross-section portions. The closed cross-section is thus formed using the open cross-section portions of the pillar outer and the pillar inner.

However, in the technology of JP-A No. 2019-064493, the open cross-section portion of the pillar inner has an open cross-section profile opening toward the vehicle width direction outer side, and forms a protrusion toward the vehicle width direction inner side outside the open cross-section portion of the pillar outer. The open cross-section portion of the pillar inner is thus liable to interfere with joining equipment when joining the flanges on the vehicle front side. It is therefore necessary to secure sufficient working space in order to avoid such interference.

Since the flanges on the vehicle front side are disposed so as to follow one vehicle width direction side end portion of a front windshield, attempting to secure working space by extending the flanges on the vehicle front side would increase the size of the framework member on the vehicle width direction inner side, which could obstruct a field of view of a driver. The technology described above leaves room for improvement regarding this point.

SUMMARY

In consideration of the above circumstances, an object of the present disclosure is to obtain a vehicle pillar structure and a manufacturing method for a vehicle pillar that enable a wide field of view to be secured when a vehicle is being driven.

A vehicle pillar structure according to a first aspect of the present disclosure includes a pillar outer, a pillar inner, a front join section, and a rear join section. The pillar outer extends so as to follow an end portion at one vehicle width direction side of a front windshield disposed at a front of a vehicle, and includes a first open cross-section having an open cross-section profile opening toward a vehicle width direction inner side in cross-section sectioned perpendicular to an extension direction of the pillar outer. The pillar inner is disposed at the vehicle width direction inner side of the pillar outer, extends so as to follow the end portion at the one vehicle width direction side of the front windshield, and includes a second open cross-section having an open cross-section profile opening toward the vehicle width direction inner side in cross-section sectioned perpendicular to an extension direction of the pillar inner and disposed inside the first open cross-section so as to form a closed cross-section together with the first open cross-section. At the front join section, front walls configuring vehicle front side walls of the first open cross-section of the pillar outer and the second open cross-section of the pillar inner are joined together. At the rear join section, vehicle rear side end portions of the pillar outer and the pillar inner are joined together.

In the vehicle pillar structure according to the first aspect of the present disclosure, the pillar inner including the second open cross-section is disposed at the vehicle width direction inner side of the pillar outer including the first open cross-section. The first open cross-section of the pillar outer extends so as to follow the end portion at the one vehicle width direction side of the front windshield disposed at the front of the vehicle, and has an open cross-section profile opening toward the vehicle width direction inner side in cross-section sectioned perpendicular to the extension direction thereof. The second open cross-section of the pillar inner has an open cross-section profile opening toward the vehicle width direction inner side in cross-section sectioned perpendicular to the extension direction thereof, and is disposed inside the first open cross-section. The front walls configuring the vehicle front side walls of the first open cross-section and the second open cross-section are joined together by the front join section. The vehicle rear side end portions of the pillar outer and the pillar inner are joined together at the rear join section. A closed cross-section is thereby formed by the first open cross-section and the second open cross-section.

Note that in the above configuration, the first open cross-section of the pillar outer and the second open cross-section of the pillar inner both have open cross-section profiles opening toward the vehicle width direction inner side, and the second open cross-section is disposed inside the first open cross-section. Accordingly, the front wall of the second open cross-section is superimposed on the front wall of the first open cross-section from the vehicle rear side, and parts of both the front walls can be used to configure joining flanges. Since joining equipment can be inserted inside the second open cross-section, working space is easily secured. Accordingly, an increase in the size of the joining flanges toward the vehicle width direction inner side is suppressed commensurately to the ease with which the working space for joining is secured, in comparison for example to configurations in which an open cross-section portion of the pillar inner opens toward the vehicle width direction outer side. As a result, the pillar outer and the pillar inner not increase in size in the vehicle width direction, enabling the size of a blind spot of the driver caused by the vehicle pillar to be reduced.

A vehicle pillar structure according to a second aspect of the present disclosure has the configuration of the first aspect, wherein the pillar outer is formed with a substantially S-shaped cross-section profile by the first open cross-section and a first flange extending from a vehicle rear side end portion of the first open cross-section toward the vehicle rear side and a vehicle width direction outer side as sectioned perpendicular to the extension direction of the pillar outer. The pillar inner is formed with a substantially S-shaped cross-section profile by the second open cross-section and a second flange extending from a vehicle rear side end portion of the second open cross-section toward the vehicle rear side and the vehicle width direction outer side as sectioned perpendicular to the extension direction of the pillar inner. The first flange and the second flange are joined together at the rear join section.

In the vehicle pillar structure according to the second aspect of the present disclosure, the first flange and the second flange that each extend toward the vehicle rear side and the vehicle width direction outer side are respectively provided to the vehicle rear side end portions of the first open cross-section and the second open cross-section. Namely, the pillar outer and the pillar inner are each formed with a substantially S-shaped cross-section profile as sectioned perpendicular to the extension direction thereof. The front walls of the pillar outer and the pillar inner that configure flanges for forming the front join section, and the first flange and the second flange used to form the rear join section, can thus be arranged substantially along a vehicle front-rear direction. This suppresses an increase in size of the pillar outer and the pillar inner in the vehicle width direction due to providing joining flanges. As a result, the size of the blind spot of the driver caused by the vehicle pillar can be reduced, enabling a wider field of view for the driver when driving the vehicle.

A vehicle pillar structure according to a third aspect of the present disclosure has the configuration of the first aspect or the second aspect, further including a front column, a rear column, and a side glass. The front column configures part of a vehicle pillar and is formed in a column shape by the pillar outer and the pillar inner. The rear column configures another part of the vehicle pillar, is disposed spaced apart from the front column by a predetermined spacing toward a vehicle rear side, extends so as to follow an extension direction of the front column, and is formed in a column shape. The side glass is disposed at a side of the vehicle, and spans between the front column and the rear column so as to cover an opening formed between the front column and the rear column.

In the vehicle pillar structure according to the third aspect of the present disclosure, the vehicle pillar includes the front column configured by the pillar outer and the pillar inner, and the rear column disposed spaced apart from the front column by a predetermined spacing toward the vehicle rear side. The side glass spans between the front column and the rear column. This allows the driver to view to the exterior of the vehicle through the side glass from between the front column and the rear column. This enables a wider field of view for the driver when driving the vehicle.

Moreover, despite the reduced cross-sectional area of the front column, the overall rigidity and strength of the vehicle pillar can be maintained by regulating the cross-sectional area of the rear column. This enables the front column disposed at the vehicle front side to be formed with a slim body, and also enables the rigidity and strength of the vehicle pillar to be maintained while effectively widening the field of view in the direction of travel when the vehicle is being driven.

A vehicle pillar structure according to a fourth aspect of the present disclosure has the configuration of the third aspect, wherein the front wall of the first open cross-section includes a first inclined portion inclined so as to follow the end portion at the one vehicle width direction side of the front windshield, and to which the end portion at the one vehicle width direction side of the front windshield is joined, and a second inclined portion disposed at a vehicle width direction outer side of the first inclined portion and inclined so as to follow a vehicle front side end portion of the side glass, and to which the vehicle front side end portion of the side glass is joined.

In the vehicle pillar structure according to the fourth aspect of the present disclosure, the first inclined portion and the second inclined portion are provided to the front wall of the first open cross-section of the pillar outer. The first inclined portion is inclined so as to follow the end portion at the one vehicle width direction side of the front windshield, and configures a joining face with the end portion on the one vehicle width direction side. The second inclined portion is inclined so as to follow the vehicle front side end portion of the side glass further toward the vehicle width direction outer side than the first inclined portion, and configures a joining face with the vehicle front side end portion. In this manner, the front wall of the pillar outer serves as a joining face joined to the end portions of the front windshield and the side glass, resulting in a structure in which joining of a styling member such as an outer panel at the front wall of the pillar outer is rendered unnecessary. This enables projection of a styling face at a vehicle outer side of the vehicle pillar to be reduced so as to create an impression of flushness, improves aerodynamic performance of a front section of the vehicle, and also enables the styling properties of the vehicle to be improved. The number of members in the vehicle pillar is also suppressed, enabling an increase in weight to be suppressed.

A manufacturing method for a vehicle pillar according to a fifth aspect of the present disclosure is a manufacturing method for a vehicle pillar applied with the vehicle pillar structure of any one of the first aspect to the fourth aspect. The manufacturing method includes a front joining process of inserting a leading end of a first welding gun inside the second open cross-section of the pillar inner, and using an eccentric electrode provided to the leading end to join the front walls of the first open cross-section and the second open cross-section together by spot welding to form the front join section, and a rear joining process of joining the vehicle rear side end portions of the pillar outer and the pillar inner together by spot welding to form the rear join section.

In the manufacturing method for a vehicle pillar according to the fifth aspect of the present disclosure, the front join section where the front walls of the first open cross-section and the second open cross-section are joined together, and the rear join section where the vehicle rear side end portions of the pillar outer and the pillar inner are joined together are formed by spot welding. In the process to form the front join section, an electrode of the welding gun is configured by the eccentric electrode. To describe this process more specifically, the leading end of the welding gun is inserted inside the second open cross-section of the pillar inner. The eccentric electrode provided to the leading end of the welding gun is then used to join the front walls of the first open cross-section and the second open cross-section together, and thereby form the front join section. When the front join section is formed by eccentric spot welding using the eccentric electrode by this method, the working space required inside the second open cross-section by the welding gun can be reduced in comparison to a method in which the front join section is formed using a straight electrode. Accordingly, interference between the welding gun and the pillar inner can be easily avoided and the ease with which work can be performed is excellent, while sufficiently securing the cross-sectional area of the closed cross-section portion of the pillar framework, despite reducing the space formed inside the second open cross-section, namely despite reducing the cross-sectional area of the second open cross-section. As a result, the rigidity demanded of the vehicle pillar can be achieved while improving the ease with which work can be performed during manufacture.

Note that a straight electrode refers to an electrode used for spot welding that has an electrode contact face that is concentric to a shaft of an electrode adaptor, whereas an eccentric electrode refers to an electrode used for spot welding that has an electrode contact face that is not concentric to the shaft of the electrode adaptor.

As described above, the vehicle pillar structures according to the first aspect and the second aspect exhibit excellent advantageous effects of enabling the size of the blind spot of the driver caused by the vehicle pillar to be reduced and enabling a wider field of view for the driver when driving the vehicle.

The vehicle pillar structure according to the third aspect exhibits excellent advantageous effects of enabling the rigidity and strength of the vehicle pillar to be maintained while effectively widening the field of view in the direction of travel when the vehicle is being driven.

The vehicle pillar structure according to the fourth aspect enables the aerodynamic performance of the front section of the vehicle to be improved and also enables the styling properties of the vehicle to be improved. An excellent advantageous effect of enabling an increase in the weight of the vehicle body to be suppressed is also exhibited.

The manufacturing method for a vehicle pillar according to the fifth aspect exhibits excellent advantageous effects of enabling the rigidity demanded of the vehicle pillar to be achieved while improving the ease with which work can be performed during manufacture.

BRIEF DESCRIPTION OF THE DRAWINGS

Exemplary embodiments of the present invention will be described in detail based on the following figures, wherein.

DETAILED DESCRIPTION

Figure 1:
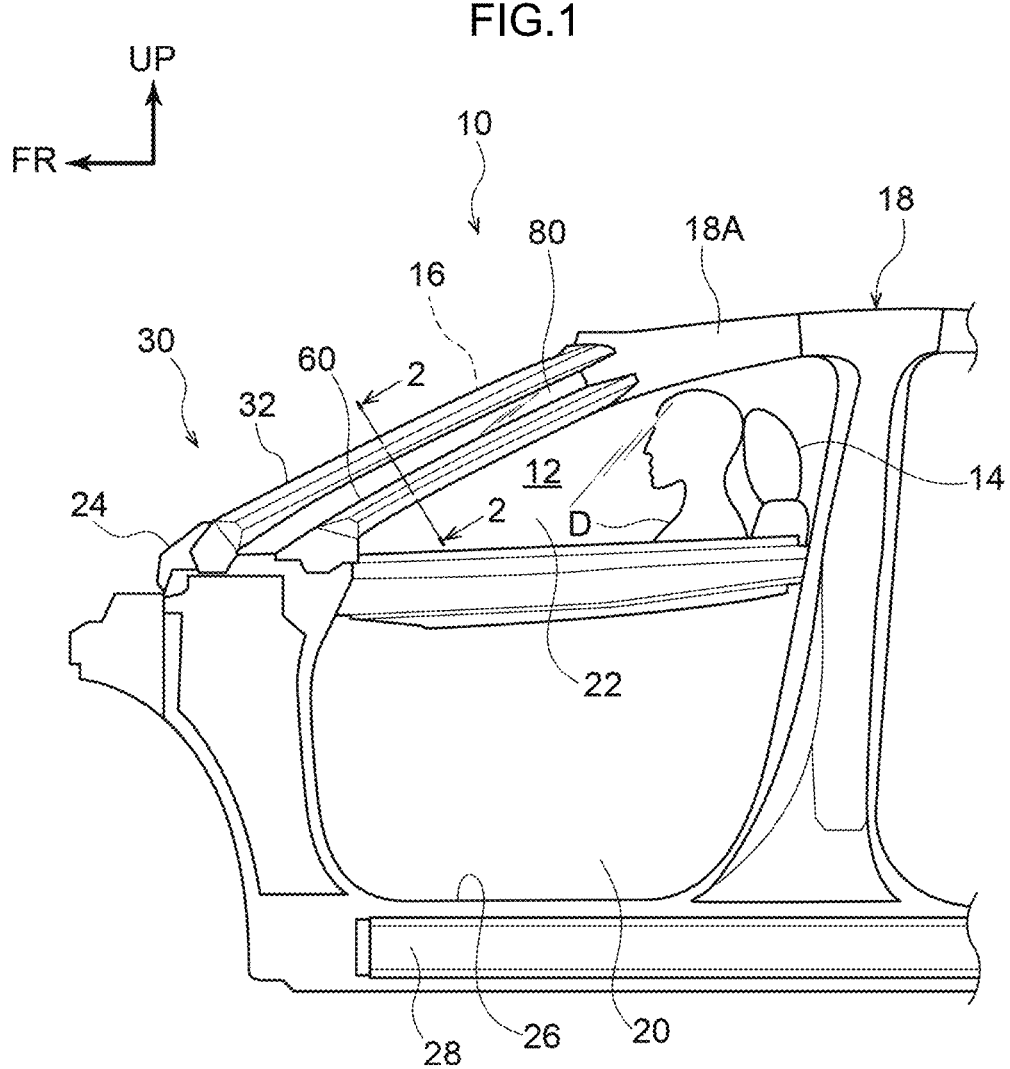
FIG. 1 is a side view schematically illustrating a body structure of a vehicle applied with a vehicle pillar structure according to an exemplary embodiment.

Explanation follows regarding a vehicle 10 applied with a vehicle pillar structure according to an exemplary embodiment, with reference to FIG. 1 to FIG. 4. Note that in the drawings, the arrow FR indicates a vehicle front side, the arrow UP indicates a vehicle upper side, and the arrow LH indicates a vehicle left side, as appropriate. Unless specifically stated otherwise, in the following explanation reference to front, rear, up, down, left, and right directions is taken to refer to front and rear in a vehicle front-rear direction, up and down in a vehicle vertical direction, and left and right when facing in a direction of travel.

As illustrated in FIG. 1, the vehicle 10 is provided with a vehicle seat 14 as a driving seat at the vehicle front side inside a vehicle cabin 12. A driver D sits in the vehicle seat 14.

A front windshield 16 (referred to hereafter as front glass 16) configuring a front face of the vehicle 10 is disposed at the vehicle front side of the vehicle seat 14. The front glass 16 is a transparent window member that separates the interior of the vehicle cabin 12 from the exterior of the vehicle cabin 12, and that has a sheet thickness direction in substantially the vehicle front-rear direction. The front glass 16 is inclined toward the vehicle rear side on progression toward the vehicle upper side as viewed from the side. An upper end portion of the front glass 16 is connected to a front header (not illustrated in the drawings) configuring a front end portion of a roof 18. A lower end portion of the front glass 16 is disposed opposing a rear end portion of a hood in the vehicle front-rear direction. The hood is provided at the vehicle front side of the front glass 16 and covers a power unit compartment from the vehicle upper side. Furthermore, the lower end portion of the front glass 16 is connected to a cowl extending in the vehicle width direction (neither the hood nor the cowl are illustrated in the drawings). Note that the front glass 16 corresponds to a front windshield of the present disclosure.

The front glass 16 is formed with a uniform sheet thickness, and has a gently curving profile such that a vehicle width direction intermediate portion of the front glass 16 protrudes toward the vehicle front side. A pair of left and right front pillars 30, serving as vehicle pillars, are provided at vehicle width direction outer sides of the front glass 16 and at vehicle front sides of front doors 20 each including side glass 22.

Figure 2:
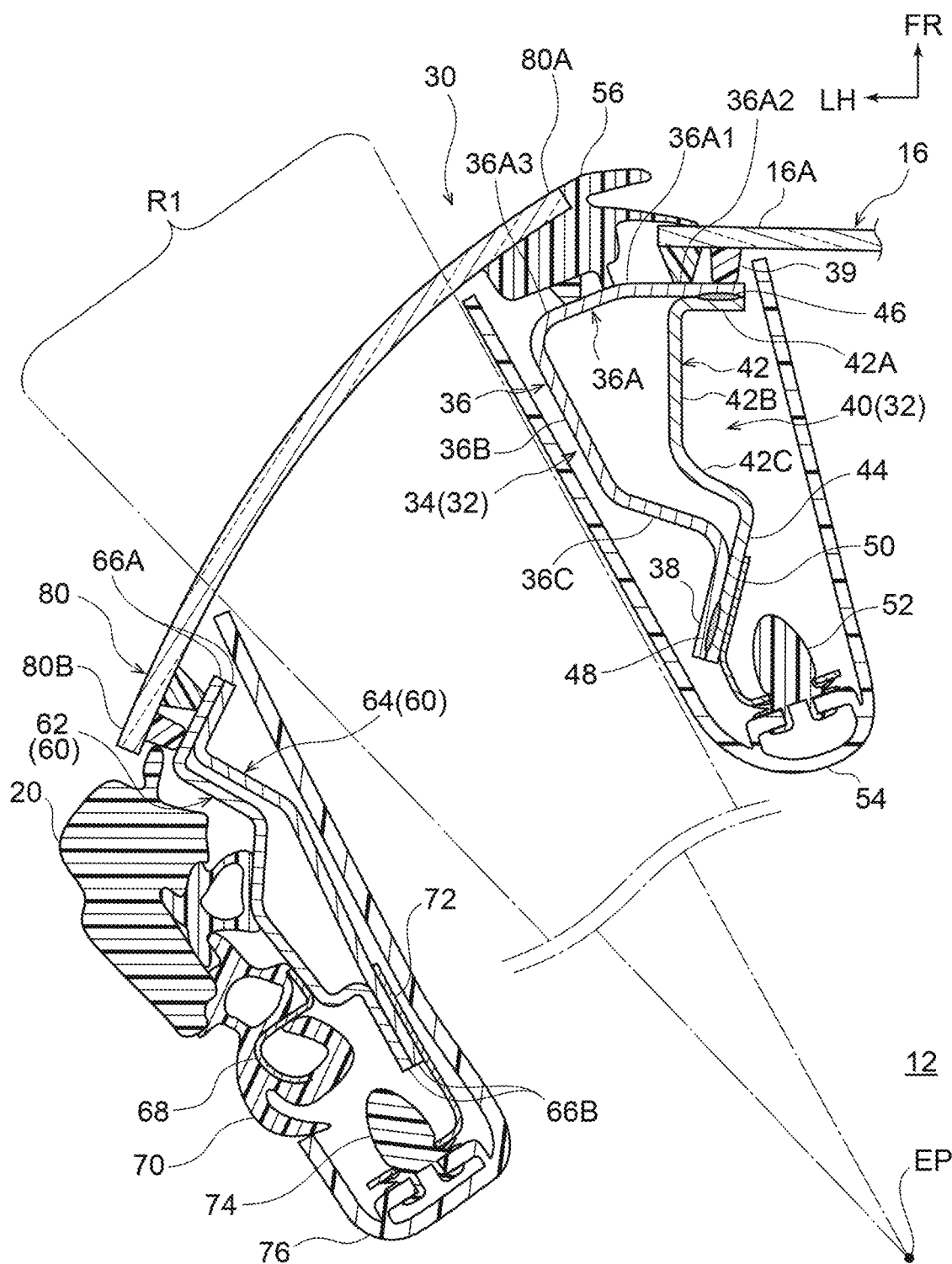
FIG. 2 is an enlarged cross-section of the vehicle pillar illustrated in FIG. 1, sectioned along line 2-2.

As illustrated in FIG. 1 and FIG. 2, the pair of left and right front pillars 30 each include a front column 32 configuring a vehicle front section thereof, and a rear column 60 configuring a vehicle rear section thereof. Pillar glass 80, serving as side glass, spans between each of the front columns 32 and the corresponding rear column 60. The pillar glass 80 is a transparent window member formed in an elongated rectangular profile as viewed from the side along the vehicle width direction. Each pillar glass 80 configures part of a side of a front section of the vehicle 10, and covers an opening formed between the front column 32 and the rear column 60. Although explanation follows regarding the front pillar 30 on the vehicle width direction left side, the front pillar 30 on the vehicle width direction right side has a similar configuration thereto.

Front Column

The front column 32 extends so as to follow an end portion 16A on one vehicle width direction side of the front glass 16. An upper end portion of the front column 32 is joined to a front end portion of a roof side rail 18A. The roof side rails 18A extend along the vehicle front-rear direction on both vehicle width direction sides of the roof 18. A lower end portion of the front column 32 is joined to a vehicle upper side end portion of a front pillar lower 24. The front pillar lower 24 extends with its length direction in the vehicle vertical direction, and a lower end portion thereof is joined to a front end portion of a rocker 28 configuring a lower portion of a door opening 26 employed for the front door 20.

Figure 3:
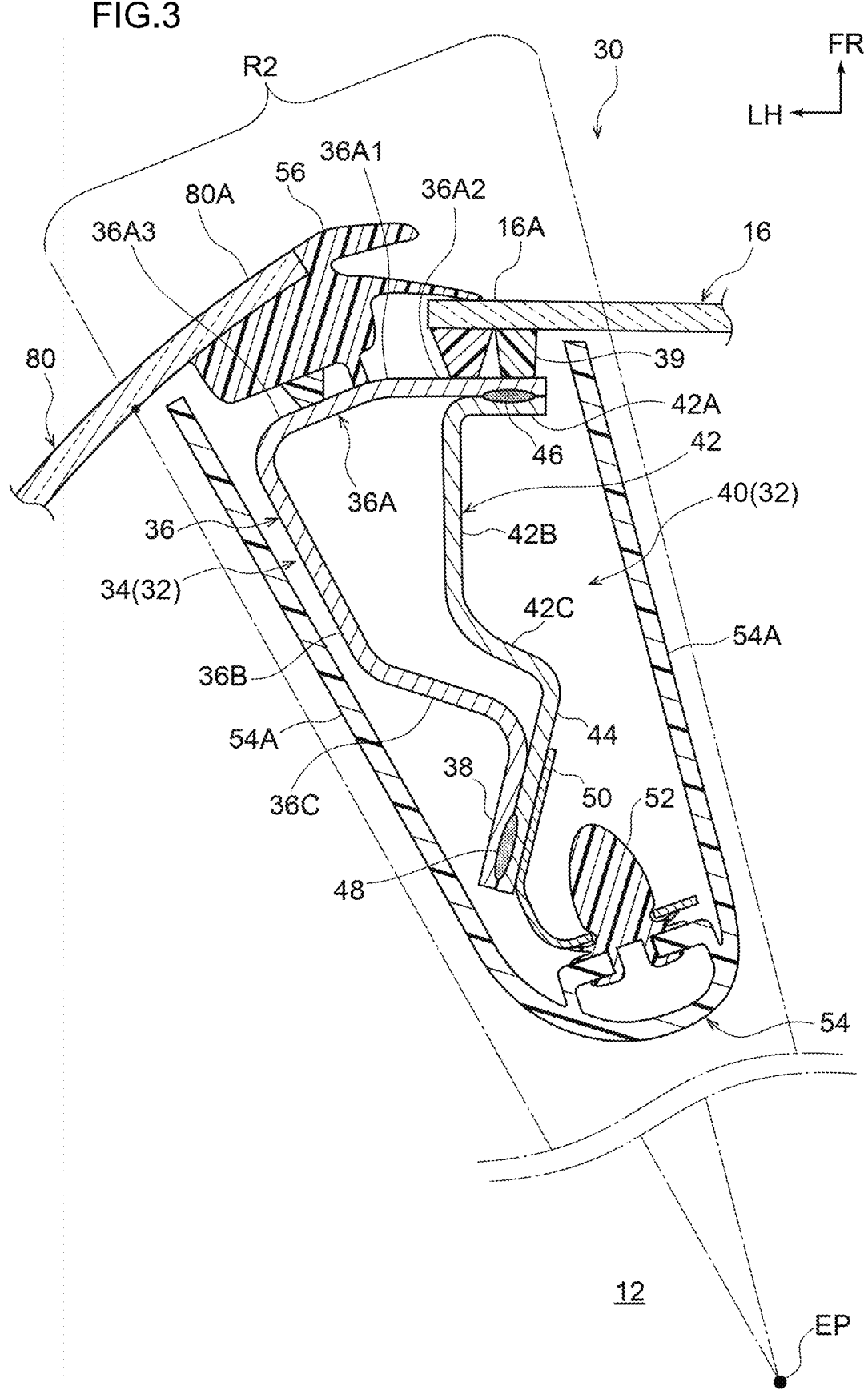
FIG. 3 is an enlarged cross-section of the front column illustrated in FIG. 2.

As illustrated in FIG. 3, the front column 32 is formed with a column shaped framework having a closed cross-section structure by a pillar outer 34 disposed at the vehicle width direction outer side and a pillar inner 40 disposed on a vehicle width direction inner side of the pillar outer 34. As an example, the pillar outer 34 and the pillar inner 40 are each made from sheet steel.

Pillar Outer

The pillar outer 34 includes a first open cross-section 36 configuring a vehicle front portion and a first flange 38 configuring a vehicle rear portion, and is formed with a substantially S-shaped cross-section profile as sectioned perpendicular to an extension direction thereof. The first open cross-section 36 includes a front wall 36A, a sidewall 36B, and a rear wall 36C. A cross-section profile of the front column 32 has an open cross-section profile opening toward the vehicle width direction inner side as sectioned perpendicular to the extension direction thereof.

The front wall 36A configures a vehicle front side wall of the first open cross-section 36, and has a plate thickness direction running substantially in the vehicle front-rear direction. A vehicle width direction intermediate portion of the front wall 36A is bent slightly such that a first inclined portion 36A2 is formed at the vehicle width direction inner side of a bent portion 36A1, and a second inclined portion 36A3 is formed at the vehicle width direction outer side of the bent portion 36A1.

The first inclined portion 36A2 extends from the bent portion 36A1 toward the vehicle width direction inner side as viewed in cross-section sectioned perpendicular to the extension direction thereof. The first inclined portion 36A2 is inclined so as to follow the end portion 16A on the one vehicle width direction side of the front glass 16. The end portion 16A on the one vehicle width direction side of the front glass 16 is joined to the first inclined portion 36A2 through a waterproof sealant material 39.

The second inclined portion 36A3 extends from the bent portion 36A1 toward the vehicle width direction outer side and vehicle rear side as viewed in cross-section sectioned perpendicular to the extension direction thereof. The second inclined portion 36A3 is inclined so as to follow an end portion 80A at the vehicle front side of the pillar glass 80. The end portion 80A at the vehicle front side of the pillar glass 80 is joined to the second inclined portion 36A3 through a sealant member 56. The sealant member 56 is disposed so as to fill a gap between the end portion 16A of the front glass 16 and the end portion 80A of the pillar glass 80, such that ingress of rainwater and the like between the front glass 16 and the pillar glass 80 is suppressed by the sealant member 56.

As illustrated in FIG. 3, the front wall 36A is covered from the vehicle front side by the front glass 16 and the pillar glass 80. The front glass 16 and the pillar glass 80 configure a styling face at the vehicle outer side of the front column 32. The styling face at the vehicle outer side of the front column 32 is imparted with a uniform quality due to the transparent window members, such that a smoothly curving face is created with substantially no location formed projecting toward the vehicle outer side. This enables an impression of flushness to be created at the styling face.

The sidewall 36B extends from a vehicle width direction outer side end portion of the second inclined portion 36A3 of the front wall 36A toward the vehicle rear side and slightly toward the vehicle width direction inner side. The rear wall 36C extends from a vehicle rear side end portion of the sidewall 36B toward the vehicle width direction inner side and slightly toward the vehicle rear side, and is thus disposed opposing the front wall 36A in the vehicle front-rear direction.

The first flange 38 extends from a rear end portion of the rear wall 36C toward the vehicle rear side and the vehicle width direction outer side. A second flange 44, described later, of the pillar inner 40 is superimposed on the first flange 38 from the vehicle width direction inner side.

Pillar Inner

As illustrated in FIG. 3, the pillar inner 40 is disposed at the vehicle width direction inner side of the pillar outer 34 and configures part of the front pillar 30 framework. The pillar inner 40 includes a second open cross-section 42 configuring a vehicle front portion of the pillar inner 40, and the second flange 44 serving as a flange configuring a vehicle rear portion of the pillar inner 40. The pillar inner 40 is formed with a substantially S-shaped cross-section profile as sectioned perpendicular to the extension direction thereof. The second open cross-section 42 is configured by a front wall 42A, a sidewall 42B, and a rear wall 42C, and has an open cross-section profile opening toward the vehicle width direction inner side in cross-section sectioned perpendicular to the extension direction of the front column 32. The second open cross-section 42 is disposed inside the open cross-section of the first open cross-section 36 of the pillar outer 34.

The front wall 42A configures a vehicle front side wall of the second open cross-section 42, and has a plate thickness direction substantially in the vehicle front-rear direction. The front wall 42A has substantially the same dimension in the vehicle width direction as the first inclined portion 36A2 of the front wall 36A of the pillar outer 34, and the front wall 42A is superimposed on the first inclined portion 36A2 from the vehicle rear side. In this manner, in the present exemplary embodiment the first inclined portion 36A2 of the front wall 36A and the front wall 42A configure a joining flange used to join a front end portion of the pillar outer 34 and a front end portion of the pillar inner 40 together. The first inclined portion 36A2 of the front wall 36A and the front wall 42A are joined together by a front join section 46. Note that the front join section 46 is formed by spot welding.

The sidewall 42B extends from a vehicle width direction outer side end portion of the front wall 42A toward the vehicle rear side and slightly toward the vehicle width direction inner side. The sidewall 42B is disposed opposing the sidewall 36B of the pillar outer 34 in the vehicle width direction. The rear wall 42C extends from a vehicle rear side end portion of the sidewall 42B toward the vehicle width direction inner side and slightly toward the vehicle rear side, such that the front wall 42A and the rear wall 42C are disposed opposing each other in the vehicle front-rear direction.

The second flange 44 extends from a rear end portion of the rear wall 42C toward the vehicle rear side and the vehicle width direction outer side. The second flange 44 is superimposed on the first flange 38 of the pillar outer 34 from the vehicle width direction inner side. The first flange 38 and the second flange 44 are joined together by a rear join section 48. Note that the rear join section 48 is formed by spot welding. The first open cross-section of the pillar outer 34 and the second open cross-section of the pillar inner 40 thus form a closed cross-section.

One end of a metal retainer 50 is joined to a vehicle width direction inner side face of the second flange 44 by a method such as welding. A resin pillar garnish 54 is fixed to the other end of the retainer 50 through a clip 52. The pillar garnish 54 extends along the extension direction of the front column 32 and has a U-shaped cross-section profile opening substantially toward the vehicle front side as sectioned perpendicular to the extension direction thereof. The front column 32 is disposed inside the U-shaped profile of the pillar garnish 54 such that the front column 32 is covered from the vehicle rear side. The pillar garnish 54 thus configures a styling face on the vehicle cabin inside of the front column 32.

As illustrated in FIG. 3, when the driver D looks toward the vehicle front side in the direction of travel from an eye point EP, the field of view of the driver D is partially obstructed by the front column 32 disposed at their oblique front side, creating a blind spot for the driver D. Note that the eye point EP is an intermediate point between the two eyes of the driver D, namely a center point of a line running between the two eyes of the driver D. In FIG. 3, a region between sidewalls 54A of the pillar garnish 54 where the blind spot of the driver D is formed is labeled as a blind spot region R2.

As described above, in the present exemplary embodiment, parts of the front walls 36A, 42A of the first open cross-section 36 and the second open cross-section 42 configure a joining flange used to form the front join section 46. Accordingly, when forming the front join section 46, a working space is needed in order to insert a welding gun at the vehicle rear side of the front wall 42A of the pillar inner 40. Since the second open cross-section 42 has an open cross-section profile opening toward the vehicle width direction inner side, the inner side of the second open cross-section 42 can be utilized as a working space. This enables joining faces to be secured without extending the front walls 36A, 42A toward the vehicle width direction inner side, and thus suppresses enlargement of the blind spot region R2 toward the vehicle width direction inner side. Moreover, the pillar outer 34 and the pillar inner 40 are each configured with a substantially S-shaped cross-section profile as sectioned perpendicular to the extension direction thereof, and the front walls 36A, 42A, the first flange 38, and the second flange 44 are arranged substantially along the vehicle front-rear direction. This suppresses the first flange 38 and the second flange 44 from enlarging the blind spot region R2 toward the vehicle width direction outer side.

Rear Column

Next, explanation follows regarding the rear column 60 configuring a vehicle rear join section of the front pillar 30.

As illustrated in FIG. 2, the rear column 60 is disposed substantially to the vehicle rear side of the front column 32. Specifically, the rear column 60 is disposed spaced apart from the front column 32 by a predetermined spacing toward substantially the vehicle front-rear direction rear side and the vehicle width direction outer side. The rear column 60 extends along the extension direction of the front column 32, and an upper end portion of the rear column 60 is joined to a front end portion of the roof side rail 18A further toward the vehicle rear side than the upper end portion of the front column 32. A lower end portion of the rear column 60 is joined to the upper end portion of the front pillar lower 24 further toward the vehicle rear side than the lower end portion of the front column 32.

A framework of the rear column 60 is formed by a rear pillar outer 62 disposed at the vehicle width direction outer side and a rear pillar inner 64 disposed spaced apart from the rear pillar outer 62 by a predetermined spacing toward the vehicle width direction inner side. As an example, the rear pillar outer 62 and the rear pillar inner 64 are each made from sheet steel.

The rear pillar outer 62 and the rear pillar inner 64 form a framework with a closed cross-section structure by superimposing front flanges 66A and rear flanges 66B respectively extending from both vehicle front-rear direction end portions of the rear pillar outer 62 and the rear pillar inner 64, and joining the front flanges 66A and the rear flanges 66B together.

The front flange 66A on the rear pillar outer 62 side is inclined so as to follow a vehicle rear side end portion 80B of the pillar glass 80. The vehicle rear side end portion 80B of the pillar glass 80 is joined to the front flange 66A on the rear pillar outer 62 side through a waterproof sealant material 67.

One end of a metal first retainer 68 is joined to a vehicle width direction outer side face of the rear pillar outer 62 by a method such as welding. An opening trim 70 is attached to the first retainer 68. A sealing member (not allocated a reference numeral) of the front door 20 is capable of abutting the rear pillar outer 62.

One end of a metal second retainer 72 is joined to a vehicle width direction inner side face of the rear flange 66B on the rear pillar inner 64 side by a method such as welding. A resin rear pillar garnish 76 is fixed to the other end of the second retainer 72 through a clip 74. The rear pillar garnish 76 extends along the extension direction of the rear column 60, and is disposed so as to cover the rear column 60 from the vehicle width direction inner side. The rear pillar garnish 76 configures a vehicle cabin inside styling face of the rear column 60.

As illustrated in FIG. 2, when the driver D looks toward the vehicle side from the eye point EP, the exterior of the vehicle can be viewed through the pillar glass 80 that spans between the front column 32 and the rear column 60 of the front pillar 30 configured as described above. In FIG. 2, a region that can be viewed by the driver D through the pillar glass 80 is labeled a visible region R1.

Manufacturing Method of Vehicle Pillar

As described above, the vehicle pillar structure of the present exemplary embodiment has various features designed to reduce the size of the blind spot of the driver D created by the front pillar 30. From the perspective of improving the ease with which work can be performed while still achieving the rigidity demanded of the front pillar 30, the pillar outer 34 and the pillar inner 40 of the front column 32 are joined together by a front joining process and a rear joining process, described below.

Figure 4:
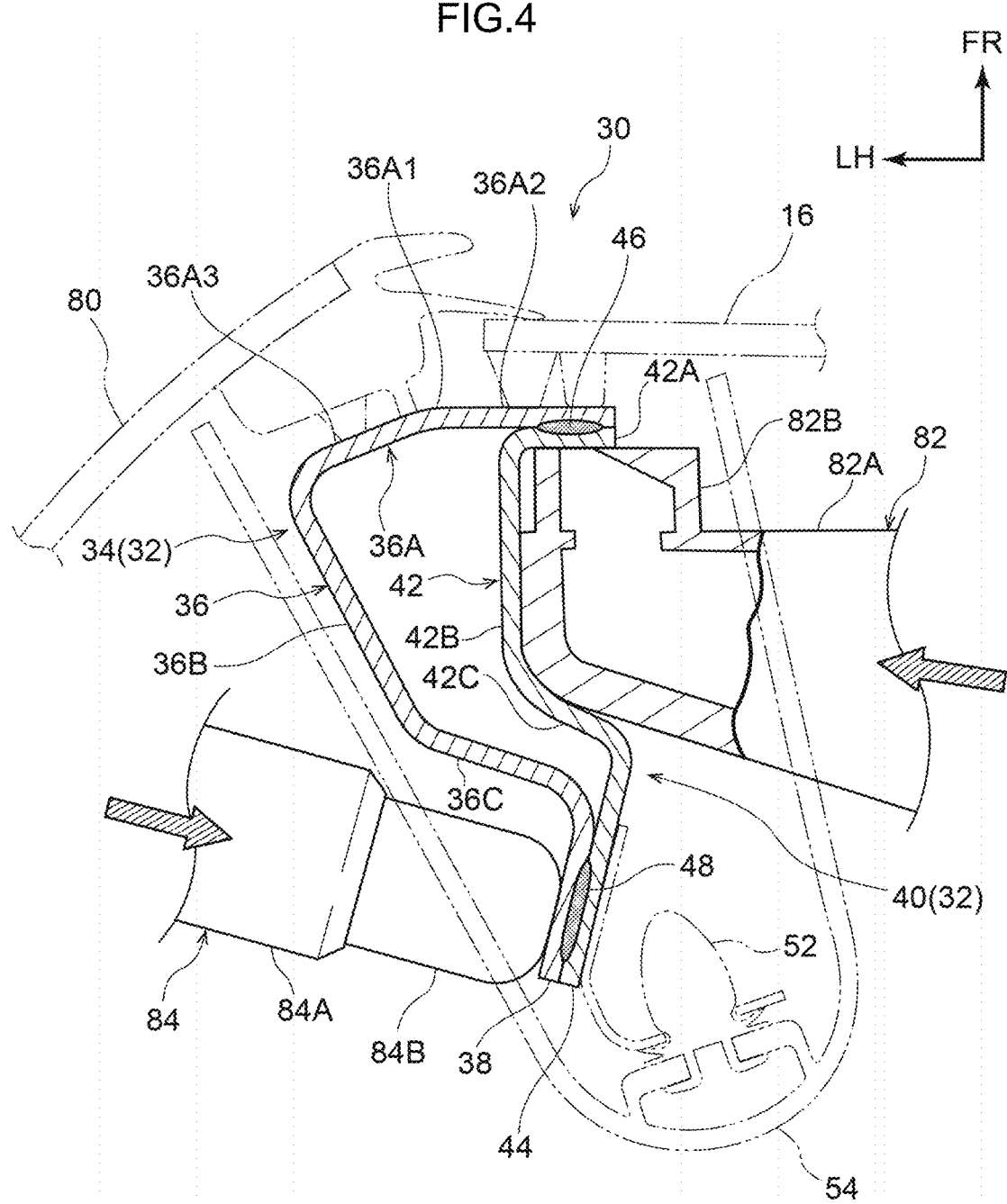
FIG. 4 is an enlarged cross-section corresponding to FIG. 3 for explaining a manufacturing method of the front column illustrated in FIG. 2.

As illustrated in FIG. 4, the front joining process is a process in which a spot welding method is employed to join the front walls 36A, 42A of the pillar outer 34 and the pillar inner 40 together to form the front join section 46. The front join section 46 is formed using a first welding gun 82 in the front joining process. The first welding gun 82 includes an electrode pair configured by a non-illustrated insert electrode and an eccentric electrode 82B disposed opposing the insert electrode. The eccentric electrode 82B is provided at a leading end of an electrode adaptor 82A configuring one holder portion of the first welding gun 82, and is bent into a substantially L-shape. A contact face with the base material is thus not concentric to the shaft of the electrode adaptor 82A.

In the front joining process, the front walls 36A, 42A are gripped between the electrode pair of the first welding gun 82, and current is passed while applying pressure so as to form the front join section 46. When this is performed, the eccentric electrode 82B is inserted inside the second open cross-section 42 of the pillar inner 40, and the insert electrode is disposed at the vehicle front side of the front wall 36A of the pillar outer 34. A predetermined number of the front join sections 46 are formed along the extension direction of the front walls 36A, 42A, thus completing the front joining process.

In the front joining process, the eccentric electrode 82B is inserted inside the second open cross-section 42 of the pillar inner 40. This enables the size of the working space inside the second open cross-section 42 to be reduced in comparison to cases in which a straight electrode concentric to the shaft of the electrode adaptor 82A is inserted inside the second open cross-section 42. Since interference between the first welding gun 82 and the pillar inner 40 can be easily avoided despite reducing the space inside the second open cross-section 42, the ease with which work can be performed is excellent. Moreover, since the space inside the second open cross-section 42 can be reduced, namely since the size of the cross-sectional area of the second open cross-section 42 can be reduced, the cross-sectional area of the closed cross-section portion formed by the pillar outer 34 and the pillar inner 40 can easily be secured. Due to employing the above-described manufacturing method in this manner, the cross-sectional rigidity of the vehicle pillar can be secured while the ease with which work can be performed during manufacture is also excellent.

The rear joining process is a process in which the rear join section 48 is formed at the first flange 38 and the second flange 44 of the pillar outer 34 and the pillar inner 40. Specifically, the first flange 38 and the second flange 44 are gripped between an electrode pair of a second welding gun 84, and current is passed while applying pressure in order to form the rear join section 48. A predetermined number of the rear join sections 48 are formed along the extension direction of the first flange 38 and the second flange 44, thus completing the rear joining process. Note that the electrode pair of the second welding gun 84 are configured by a non-illustrated insert electrode, and a straight electrode 84B disposed opposing the insert electrode. The straight electrode 84B is provided at a leading end of an electrode adaptor 84A configuring one holder portion of the second welding gun 84, and is concentric to the shaft of the electrode adaptor 84A. Note that there is no limitation thereto, and an electrode of the second welding gun may be configured by an eccentric electrode.

Operation and Advantageous Effects

Figure 5:
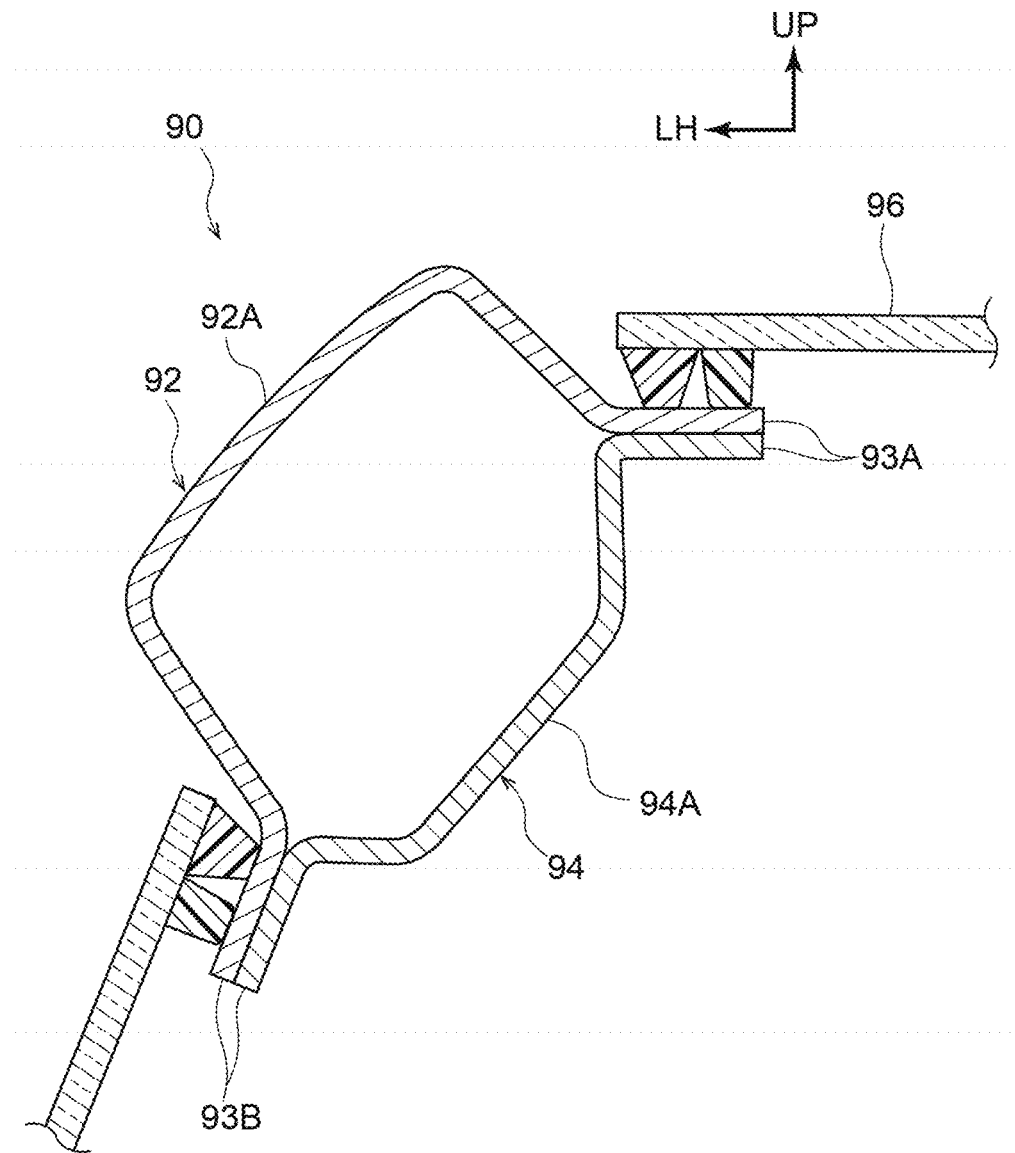
FIG. 5 is an enlarged cross-section corresponding to FIG. 3, illustrating a vehicle pillar structure serving as a comparative example.

Explanation follows regarding operation and advantageous effects of the present exemplary embodiment, drawing comparisons with a vehicle pillar 90 illustrated in FIG. 5.

In the vehicle pillar 90 illustrated in FIG. 5, a closed cross-section is formed by joining an open cross-section portion 92A formed to a pillar outer 92 and an open cross-section portion 94A formed to a pillar inner 94 in the vehicle width direction. Furthermore, flanges 93A, 93B respectively extend out from both vehicle front-rear direction end portions of the open cross-section portions 92A, 94A of the pillar outer 92 and the pillar inner 94. The respective flanges are superimposed on each other and joined together.

Note that in the vehicle pillar 90, the open cross-section portion 92A of the pillar outer 92 has an open cross-section profile opening toward the vehicle width direction inner side, and the open cross-section portion 94A of the pillar inner 94 has an open cross-section profile opening toward the vehicle width direction outer side. The open cross-section portion 94A of the pillar inner 94 is thus disposed outside the open cross-section portion 92A of the pillar outer 92, forming a protrusion toward the vehicle width direction inner side. Accordingly, since the open cross-section portion 94A is liable to get in the way of joining equipment when joining the vehicle front side flanges 93A together, it is necessary to secure sufficient working space in order to avoid such interference. Moreover, since the flanges 93A are disposed so as to follow a vehicle width direction end portion of a front windshield 96, if the flanges 93A were extended toward the vehicle width direction inner side in order to secure such a working space, the size of the pillar outer 92 and the pillar inner 94 would be increased on the vehicle width direction inner side.

By contrast, in the front pillar 30 according to the present exemplary embodiment, the first open cross-section 36 of the pillar outer 34 and the second open cross-section 42 of the pillar inner 40 of the front column 32 both have open cross-section profiles opening toward the vehicle width direction inner side, and the second open cross-section 42 is disposed inside the first open cross-section 36. Accordingly, the front wall 42A of the second open cross-section 42 is superimposed on the front wall 36A of the first open cross-section 36 from the vehicle rear side, and parts of both the front walls 36A, 42A can be used to configure joining flanges. Since joining equipment such as a welding gun can be inserted inside the second open cross-section 42, working space is easily secured. Accordingly, an increase in the size of the front walls 36A, 42A that configure joining flanges toward the vehicle width direction inner side is suppressed in comparison to the vehicle pillar 90 illustrated in FIG. 5. As a result, the pillar outer 34 and the pillar inner 40 do not increase in size in the vehicle width direction, enabling the size of the blind spot of the driver D caused by the front pillar 30 to be reduced.

Moreover, since the first open cross-section 36 and the second open cross-section 42 have open cross-section profiles opening toward the vehicle width direction inner side, the front walls 36A, 42A can be superimposed on each other at end portions on the front glass 16 side (vehicle width direction inner side) of the first open cross-section 36 and the second open cross-section 42. This enables flanges (the front walls 36A, 42A) to be provided at the vehicle width direction inner side of the front column 32, similarly to in traditional pillar structures. As a result, coupling portions with the roof side rail 18A and the front pillar lower 24 respectively disposed at the vehicle upper side and lower side of the front column 32 can be formed easily.

Moreover, in the present exemplary embodiment, the first flange 38 and the second flange 44 that extend toward the vehicle rear side and the vehicle width direction outer side are respectively provided to the vehicle rear side end portions of the first open cross-section 36 and the second open cross-section 42. Namely, the pillar outer 34 and the pillar inner 40 are each formed with a substantially S-shaped cross-section profile as sectioned perpendicular to the extension direction thereof. The front walls 36A, 42A of the pillar outer 34 and the pillar inner 40 that configure flanges for forming the front join section 46, and the first flange 38 and the second flange 44 used to form the rear join section 48, can thus be arranged substantially along the vehicle front-rear direction. This suppresses an increase in the size of the pillar outer 34 and the pillar inner 40 in the vehicle width direction due to providing the joining flanges. As a result, the size of the blind spot of the driver D caused by the front pillar 30 can be reduced, enabling a wider field of view to be secured for the driver D when driving the vehicle.

The front pillar 30 of the present exemplary embodiment includes the column shaped front column 32 configured by the pillar outer 34 and the pillar inner 40, and the rear column 60 disposed spaced apart from the front column 32 by a predetermined spacing toward the vehicle rear side. The pillar glass 80 spans between the front column 32 and the rear column 60. This allows the driver D to view to the exterior of the vehicle through the pillar glass 80 from between the front column 32 and the rear column 60. This enables a wider field of view for the driver D when driving the vehicle.

Moreover, despite the reduced cross-sectional area of the front column 32, the overall rigidity and strength of the front pillar 30 can be maintained by regulating the cross-sectional area of the rear column 60. This enables the front column 32 disposed at the vehicle front side to be formed with a slim body, and also enables the rigidity and strength of the front pillar 30 to be maintained while effectively widening the field of view in the direction of travel when the vehicle is being driven.

In the present exemplary embodiment, the first inclined portion 36A2 and the second inclined portion 36A3 are provided to the front wall 36A of the first open cross-section 36 of the pillar outer 34. The first inclined portion 36A2 is inclined so as to follow the end portion 16A on the one vehicle width direction side of the front glass 16, and configures a joining face with the end portion 16A. The second inclined portion 36A3 is inclined so as to follow the vehicle front side end portion 80A of the pillar glass 80 further toward the vehicle width direction outer side than the first inclined portion 36A2, and configures a joining face with the end portion 80A. In this manner, the front wall 36A of the pillar outer 34 serves as a joining face joined to end portions of the glass members disposed at the front and a side of the vehicle 10, resulting in a structure in which a styling member such as an outer panel is rendered unnecessary at the front wall 36A of the pillar outer 34. This enables any projection of the styling face at the vehicle outer side of the front pillar 30 to be reduced so as to create an impression of flushness, improves aerodynamic performance of the front section of the vehicle 10, and also enables the styling properties of the vehicle 10 to be improved. The number of members in the vehicle pillar is also suppressed, enabling an increase in weight to be suppressed.

In the present exemplary embodiment, in the manufacturing processes for the front pillar 30, the front join section 46 where the front walls 36A, 42A of the first open cross-section 36 and the second open cross-section 42 are joined together, and the rear join section 48 where the first flange 38 and the second flange 44 configuring vehicle rear side end portions of the pillar outer 34 and the pillar inner 40 are joined together are formed by spot welding. In the front joining process to form the front join section 46, an electrode of the welding gun 82 is configured by the eccentric electrode 82B.

To describe this process more specifically, as illustrated in FIG. 4, the leading end of the first welding gun 82 is inserted inside the second open cross-section 42 of the pillar inner 40. The eccentric electrode 82B provided to the leading end of the first welding gun 82 is then used to join the front walls 36A, 42A of the first open cross-section 36 and the second open cross-section 42 together, and thereby form the front join section 46. When the front join section 46 is formed using the eccentric electrode 82B by this method, the working space required inside the second open cross-section 42 by the welding gun can be reduced in comparison to a method in which the front join section 46 is formed using the straight electrode 84B. Accordingly, interference between the first welding gun 82 and the pillar inner 40 can be easily avoided and the ease with which work can be performed is excellent, while also sufficiently securing the cross-sectional area of the closed cross-section portion of the pillar framework, despite reducing the space formed inside the second open cross-section 42, namely despite reducing the cross-sectional area of the second open cross-section 42. As a result, the rigidity demanded of the front pillar 30 can be achieved while improving the ease with which work can be performed during manufacture.

Supplementary Explanation

Although the front pillar 30 is configured including the front column 32 and the rear column 60 in the exemplary embodiment described above, the present disclosure is not limited thereto. A front pillar may be configured so as to include the front column 32 but not include the rear column 60. In such cases, the front column 32 is disposed between one vehicle width direction end of the front glass 16 disposed at the front face of the vehicle 10 and the side glass 22 disposed at the side of the vehicle. Moreover, end portions of the front glass 16 and the side glass 22 serving as side glass are joined to the front wall 36A of the pillar outer 34.

Note that the front glass 16, the side glass 22, and the pillar glass 80 of the present exemplary embodiment are not limited to being made of glass, and may be made of resin.

Although the front join section 46 of the front column 32 is formed using the first welding gun 82 that includes the eccentric electrode 82B in the present exemplary embodiment, the present disclosure is not limited thereto. The front join section 46 may be formed using a welding gun provided with the straight electrode 84B, similarly to the second welding gun 84.

What is claimed is:

1. A vehicle pillar structure comprising:
    a pillar outer that extends so as to follow an end portion at one vehicle width direction side of a front windshield disposed at a front of a vehicle, and that includes a first open cross-section having an open cross-section profile opening toward a vehicle width direction inner side in cross-section sectioned perpendicular to an extension direction of the pillar outer;
    a pillar inner that is disposed at the vehicle width direction inner side of the pillar outer, that extends so as to follow the end portion at the one vehicle width direction side of the front windshield, and that includes a second open cross-section having an open cross-section profile opening toward the vehicle width direction inner side in cross-section sectioned perpendicular to an extension direction of the pillar inner and disposed inside the first open cross-section so as to form a closed cross-section together with the first open cross-section;
    a front join section where front walls configuring vehicle front side walls of the first open cross-section of the pillar outer and the second open cross-section of the pillar inner are joined together; and a rear join section where vehicle rear side end portions of the pillar outer and the pillar inner are joined together, wherein
the front walls and the rear side end portions overlap in a substantially longitudinal direction of the vehicle.

2. The vehicle pillar structure of claim 1, wherein:
the pillar outer includes a first flange extending from a vehicle rear side end portion of the first open cross-section toward a vehicle rear side and a vehicle width direction outer side;
the pillar inner includes a second flange extending from a vehicle rear side end portion of the second open cross-section toward the vehicle rear side and the vehicle width direction outer side; and
the first flange and the second flange are joined together at the rear join section.

3. The vehicle pillar structure of claim 2, wherein:
the pillar outer is formed with a substantially S-shaped cross-section profile by the first open cross-section and the first flange as sectioned perpendicular to the extension direction of the pillar outer; and
the pillar inner is formed with a substantially S-shaped cross-section profile by the second open cross-section and the second flange as sectioned perpendicular to the extension direction of the pillar inner.

4. The vehicle pillar structure of claim 1, further comprising:
a front column that configures part of a vehicle pillar and that is formed in a column shape by the pillar outer and the pillar inner;
a rear column that configures another part of the vehicle pillar, that is disposed spaced apart from the front column by a predetermined spacing toward a vehicle rear side, that extends so as to follow an extension direction of the front column, and that is formed in a column shape; and
a side glass that is disposed at a side of the vehicle, and that spans between the front column and the rear column so as to cover an opening formed between the front column and the rear column.

5. The vehicle pillar structure of claim 4, wherein an upper end portion of the front column is joined to a front end portion of a roof side rail, and a lower end portion of the front column is joined to a vehicle upper side end portion of a front pillar lower.

6. The vehicle pillar structure of claim 4, wherein a front wall of the first open cross-section includes:
a first inclined portion inclined so as to follow the end portion at the one vehicle width direction side of the front windshield, and to which the end portion at the one vehicle width direction side of the front windshield is joined; and
a second inclined portion disposed at a vehicle width direction outer side of the first inclined portion and inclined so as to follow a vehicle front side end portion of the side glass, and to which the vehicle front side end portion of the side glass is joined.

7. The vehicle pillar structure of claim 6, wherein a front wall of the first open cross-section is bent at a vehicle width direction intermediate portion as viewed along an extension direction of the first open cross-section such that the first inclined portion is configured at a vehicle width direction inner side of the bent portion and the second inclined portion is configured at a vehicle width direction outer side of the bent portion.

8. A manufacturing method for a vehicle pillar applied with the vehicle pillar structure of claim 1, the manufacturing method comprising:
a front joining process of inserting a leading end of a first welding gun inside the second open cross-section of the pillar inner, and using an eccentric electrode provided at the leading end to join the front walls of the first open cross-section and the second open cross-section together by spot welding to form the front join section; and
a rear joining process of joining the vehicle rear side end portions of the pillar outer and the pillar inner together by spot welding to form the rear join section.

9. The vehicle pillar manufacturing method of claim 8, wherein the rear joining process includes using a second welding gun, with a leading end provided with a straight electrode, to join the vehicle rear side end portions of the pillar outer and the pillar inner together to form the rear join section.

10. A vehicle pillar structure comprising:
a pillar outer that extends so as to follow an end portion at one vehicle width direction side of a front windshield disposed at a front of a vehicle, and that includes a first open cross-section having an open cross-section profile opening toward a vehicle width direction inner side in cross-section sectioned perpendicular to an extension direction of the pillar outer;
a pillar inner that is disposed at the vehicle width direction inner side of the pillar outer, that extends so as to follow the end portion at the one vehicle width direction side of the front windshield, and that includes a second open cross-section having an open cross-section profile opening toward the vehicle width direction inner side in cross-section sectioned perpendicular to an extension direction of the pillar inner and disposed inside the first open cross-section so as to form a closed cross-section together with the first open cross-section;
a front join section where front walls configuring vehicle front side walls of the first open cross-section of the pillar outer and the second open cross-section of the pillar inner are joined together; and
a rear join section where vehicle rear side end portions of the pillar outer and the pillar inner are joined together, wherein:
the pillar outer includes a first flange extending from a vehicle rear side end portion of the first open cross-section toward a vehicle rear side and a vehicle width direction outer side;
the pillar inner includes a second flange extending from a vehicle rear side end portion of the second open cross-section toward the vehicle rear side and the vehicle width direction outer side; and
the first flange and the second flange are joined together at the rear join section,
the pillar outer is formed with a substantially S-shaped cross-section profile by the first open cross-section and the first flange as sectioned perpendicular to the extension direction of the pillar outer; and
the pillar inner is formed with a substantially S-shaped cross-section profile by the second open cross-section and the second flange as sectioned perpendicular to the extension direction of the pillar inner.

11. The vehicle pillar structure of claim 10, further comprising:
a front column that configures part of a vehicle pillar and that is formed in a column shape by the pillar outer and the pillar inner;

a rear column that configures another part of the vehicle pillar, that is disposed spaced apart from the front column by a predetermined spacing toward a vehicle rear side, that extends so as to follow an extension direction of the front column, and that is formed in a column shape; and a side glass that is disposed at a side of the vehicle, and that spans between the front column and the rear column so as to cover an opening formed between the front column and the rear column.

12. The vehicle pillar structure of claim 11, wherein an upper end portion of the front column is joined to a front end portion of a roof side rail, and a lower end portion of the front column is joined to a vehicle upper side end portion of a front pillar lower.

13. The vehicle pillar structure of claim 11, wherein a front wall of the first open cross-section includes:
   a first inclined portion inclined so as to follow the end portion at the one vehicle width direction side of the front windshield, and to which the end portion at the one vehicle width direction side of the front windshield is joined; and
   a second inclined portion disposed at a vehicle width direction outer side of the first inclined portion and inclined so as to follow a vehicle front side end portion of the side glass, and to which the vehicle front side end portion of the side glass is joined.

14. The vehicle pillar structure of claim 13, wherein a front wall of the first open cross-section is bent at a vehicle width direction intermediate portion as viewed along an extension direction of the first open cross-section such that the first inclined portion is configured at a vehicle width direction inner side of the bent portion and the second inclined portion is configured at a vehicle width direction outer side of the bent portion.

15. A manufacturing method for a vehicle pillar applied with the vehicle pillar structure of claim 10, the manufacturing method comprising:
   a front joining process of inserting a leading end of a first welding gun inside the second open cross-section of the pillar inner, and using an eccentric electrode provided at the leading end to join the front walls of the first open cross-section and the second open cross-section together by spot welding to form the front join section; and
   a rear joining process of joining the vehicle rear side end portions of the pillar outer and the pillar inner together by spot welding to form the rear join section.

16. The vehicle pillar manufacturing method of claim 10, wherein the rear joining process includes using a second welding gun, with a leading end provided with a straight electrode, to join the vehicle rear side end portions of the pillar outer and the pillar inner together to form the rear join section.

* * * * *